(12) United States Patent
Tomkins et al.

(10) Patent No.: US 9,424,247 B1
(45) Date of Patent: Aug. 23, 2016

(54) ASSOCIATING ONE OR MORE TERMS IN A MESSAGE TRAIL WITH A TASK ENTRY

(71) Applicant: Google Inc., Mountain View, CA (US)

(72) Inventors: Andrew Tomkins, Menlo Park, CA (US); Shanmugasundaram Ravikumar, Berkeley, CA (US); Shalini Agarwal, San Francisco, CA (US); Bo Pang, Sunnyvale, CA (US); Mark Yinan Li, San Francisco, CA (US)

(73) Assignee: Google Inc., Mountain View, CA (US)

( * ) Notice: Subject to any disclaimer, the term of this patent is extended or adjusted under 35 U.S.C. 154(b) by 139 days.

(21) Appl. No.: 14/145,247

(22) Filed: Dec. 31, 2013

(51) Int. Cl.
*G06F 17/28* (2006.01)
*G06F 17/27* (2006.01)

(52) U.S. Cl.
CPC ........ *G06F 17/2765* (2013.01); *G06F 17/2872* (2013.01); *G06F 17/2755* (2013.01)

(58) Field of Classification Search
USPC ...................................... 704/4, 9, 2, 3, 5, 6, 7
See application file for complete search history.

(56) References Cited

U.S. PATENT DOCUMENTS

| | | | |
|---|---|---|---|
| 5,603,054 A | 2/1997 | Theimer et al. | |
| 6,115,709 A | 9/2000 | Gilmour et al. | |
| 6,438,543 B1 | 8/2002 | Kazi et al. | |
| 6,842,877 B2 | 1/2005 | Robarts et al. | |
| 7,496,500 B2 | 2/2009 | Reed et al. | |
| 7,702,631 B1 | 4/2010 | Basu et al. | |
| 7,813,916 B2 | 10/2010 | Bean | |
| 8,046,226 B2 | 10/2011 | Soble et al. | |
| 8,055,707 B2 | 11/2011 | Desai et al. | |
| 8,108,206 B2 | 1/2012 | Hufnagel et al. | |
| 8,364,467 B1 | 1/2013 | Bowman et al. | |
| 8,375,099 B2 | 2/2013 | Carroll et al. | |
| 8,417,650 B2 | 4/2013 | Graepel et al. | |
| 8,521,818 B2 | 8/2013 | McGann et al. | |
| 8,560,487 B2 | 10/2013 | Jhoney et al. | |
| 8,599,801 B2 | 12/2013 | Baio et al. | |
| 2005/0192992 A1* | 9/2005 | Reed et al. .................... 707/101 |
| 2009/0307212 A1 | 12/2009 | Ramot et al. | |
| 2012/0005221 A1 | 1/2012 | Ickman et al. | |
| 2012/0030588 A1 | 2/2012 | Sinha | |
| 2012/0095748 A1* | 4/2012 | Li et al. ............................ 704/8 |
| 2012/0150532 A1 | 6/2012 | Mirowski et al. | |
| 2012/0239761 A1 | 9/2012 | Linner et al. | |
| 2012/0317499 A1 | 12/2012 | Shen | |
| 2012/0331036 A1 | 12/2012 | Duan et al. | |
| 2013/0073662 A1 | 3/2013 | Meunier et al. | |
| 2013/0159270 A1 | 6/2013 | Urmy et al. | |
| 2013/0290436 A1 | 10/2013 | Martin et al. | |
| 2013/0297551 A1 | 11/2013 | Smith et al. | |

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages.

(Continued)

*Primary Examiner* — Vu B Hang
(74) *Attorney, Agent, or Firm* — Middleton Reutlinger

(57) ABSTRACT

Methods and apparatus related to determining an association between a message trail and a task entry of a user and associating an n-gram with the task entry, wherein the n-gram is based on one or more messages of the message trail. A similarity score between the n-gram and one or more aspects of the associated task entry may be determined. The similarity score may be utilized, for example, to determine when to associate the n-gram with the task entry and/or how to utilize the associated n-gram with the task entry.

23 Claims, 7 Drawing Sheets

(56) References Cited

OTHER PUBLICATIONS

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

* cited by examiner

ASSOCIATING ONE OR MORE TERMS IN A MESSAGE TRAIL WITH A TASK ENTRY

BACKGROUND

A user may have interest in creating one or more tasks and the user may utilize one or more applications to create the tasks. For example, a user may have interest in creating a task that is related to attending an event and a task may be created that includes information related to the event.

SUMMARY

This specification is directed to methods and apparatus related to associating a message trail with a task entry and associating one or more terms in the message trail with the task entry. For example, a determined n-gram from a new message in the message trail may be associated with the task entry. A task entry may be associated with one or more information fields that include information related to the task. The n-gram may be utilized as an entry and/or potential entry for one or more of the information fields of the task entry. Some implementations of the specification are generally directed to identifying a task entry of a user, identifying one or more messages that are sent or received by the user, associating the task entry with the messages based on one or more identified terms in the messages, identifying a new message that is associated with the messages, determining an n-gram based on the terms of the new message, and associating the n-gram with the task entry.

A similarity score between the n-gram and one or more aspects of the associated task entry may be determined that is indicative of a likelihood that the user has interest in associating the n-gram with the aspects of the task entry. Some implementations of the specification are directed to utilizing the provided n-gram to provide one or more suggestions to a user when the user is editing the associated task entry. Some implementations of the specification are directed to altering information of one or more information fields of the task entry based on the similarity score between the task entry and the n-gram.

In some implementations, a method is provided that includes the steps of: identifying a task entry of a user, the task entry including one or more information fields; identifying one or more messages sent or received by the user, each of the messages including one or more terms; identifying an association between the task entry and the one or more messages; identifying a new message that is related to the one or more messages, the new message sent or received by the user, and the new message including one or more new message terms; determining an n-gram based on the one or more new message terms; determining a similarity score between the n-gram and the task entry, the similarity score indicative of a likelihood that the user has interest in associating the n-gram with the task entry; and associating the n-gram with the task entry based on the similarity score.

This method and other implementations of technology disclosed herein may each optionally include one or more of the following features.

The task entry may be determined based on the one or more messages. The similarity score may be between the n-gram and a given information field of the task entry, and the step of associating the n-gram with the task entry may include associating the n-gram with the given information field based on the similarity score. One or more task terms may be assigned to the given information field. The method may further include the step of ranking the n-gram relative to other n-grams associated with the given information field, the ranking for the n-gram based on the similarity score.

The one or more task terms may be identified from the terms of the one or more messages. In some of those implementations, the method may further include the step of replacing the task terms with the n-gram if the similarity score between the n-gram and the given information field satisfies a threshold value. In some of those implementations, the method may further include prompting the user to replace the task terms with the n-gram.

The method may further include the steps of: identifying an input term, the input term provided by the user and associated with an input task information field of the task information fields; ranking the n-gram relative to other n-grams based on similarity between the n-gram and the input term; and providing the n-gram to the user as an autocomplete suggestion for the input term based on the ranking. In some of those implementations, the ranking may be further based on the similarity score. In some of those implementations, the method may further include the step of determining at least one of the other n-grams from the one or more messages.

The method may further include the steps of: determining an annotation for the n-gram, the annotation determined based on one or more other terms of the new message; and associating the annotation with the n-gram.

At least one of the information fields of the task entry may be associated with an entity, and the step of determining the similarity score may include determining an association between the n-gram and the entity.

In some implementations, a method is provided that includes the steps of: identifying a task entry of a user, the task entry including one or more information fields, and a given information field may be associated with a task term; identifying one or more messages sent or received by the user, each of the messages including one or more message terms; identifying an association between the task entry and the one or more messages; determining an n-gram based on the message terms of one or more of the messages; determining a similarity score between the n-gram and the given information field of the task entry; ranking the n-gram and the task term based on the similarity score. The method may further include the step of identifying an input term, the input term provided by the user, and the ranking based on the input term.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein determine an n-gram from a message in a message trail that is associated with a task entry and determine a similarity score between one or more aspects of the task entry and the n-gram. The n-gram may be associated with the task entry based on the determined similarity score. The n-gram may optionally be associated with one or more information fields of the task entry.

It should be appreciated that all combinations of the foregoing concepts and additional concepts discussed in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
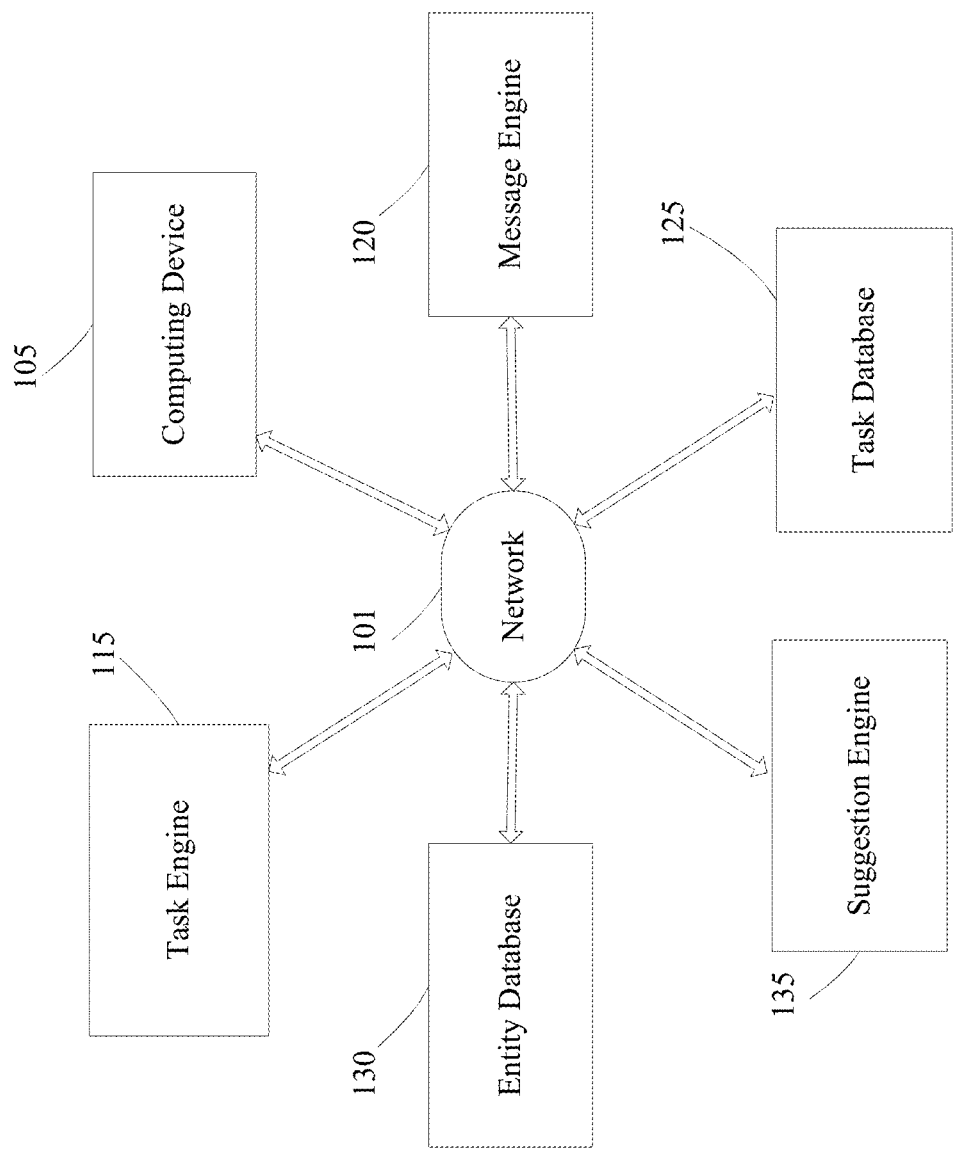
FIG. 1 is a block diagram of an example environment in which an n-gram of one or more messages of a message trail may be associated with a task entry.

A task entry of a user may be created that is based on input and/or suggestions from one or more users. For example, a user may have interest in creating a task entry for an event that is associated with multiple users and the details of the event may be determined, updated, and/or altered based on input from one or more of the multiple users that have interest in attending and/or planning the event. A created task entry may be altered based on changing opinions and/or circumstances of one or more of the interested users. For example, a task entry may be created to attend a party at "Restaurant 1" and one of the interested users may suggest to other interested users that "Restaurant 2" may be a better venue for the party. Also, for example, a task entry for a party may be created with an event time of "8 pm" and one of the interested users may call the event location and determine that the venue will not be able to accommodate the party at "8 pm" and suggest that the event time be moved to "7 pm" and/or that the event venue be moved to a different venue.

A task entry may include one or more information fields that include information that is related to a task of the task entry. For example, a task entry may include a time information field, a date information field, and/or a venue information field that may include information related to the task. Information fields may include information that may be utilized to, for example, provide a user with a reminder of an upcoming event and/or display information related to an event that is associated with the user. In some implementations, a task entry may be created by a user utilizing, for example, a calendar application, an application that is dedicated to creating task entries, and/or one or more modules of other applications that may be utilized by a user, such as an email application and/or a web browser. In some implementations, a task entry may be created by one or more applications based on information that is identified from one or more additional sources of task information. For example, one or more applications may identify information related to a task from one or more documents of a user and create a task entry without further input from the user. In some implementations, the user may be prompted to confirm the creation of the new task entry before the task entry is created.

Multiple users associated with a task entry may communicate with one another utilizing a message trail of messages that may be provided to one or more of the multiple users. Messages include, for example, emails, text messages, message board postings, instant messages, and/or social media postings. A message trail includes two or more related messages. In some implementations, a message trail may include one or more messages that are sent and/or received by the user and sent and/or received by one or more other users. In some implementations, a message trail may be identified by determining associations between one or more messages (e.g., similar recipients, same subject line, similar terms in text of messages). For example, a task entry may be created for an event based on one or more suggestions in an email that is provided to interested users. One or more of the interested users may reply to the email with one or more suggested and/or required alterations to the task entry. Suggested and/or required alterations to the task entry may be identified from the email replies of the interested users and a task entry may be altered based on the content of the email replies. One or more aspects of the event may be changed based on identifying a message trail that is associated with the task entry for the event and altering information fields of the task entry based on terms that are identified in one or more messages of the message trail.

Additionally or alternatively, a user may have interest in changing and/or adding information to a task entry that has been created. For example, based on messages of a message trail from one or more other users, a user may select a "time" information field of the task entry and change the time of the event based on determining, from the message trail, that the original venue for the task entry cannot accommodate the event at the originally suggested time. Also, for example, the user may select a "venue" information field of a task entry via an application and input a different venue location based on a suggestion of one or more of the interested users. In some implementations, one or more suggestions may be provided to the user to assist the user in changing the information field. In some implementations, suggestions may be autocomplete suggestions that are provided to a user in response to the user submitting a partial term. One or more of the suggestions may be ranked based on identified terms from the messages related to the task entry. For example, a message trail may include the terms "What about ABC," the user may select a task entry that is associated with the message trail, and select a venue information field and begin to type "A." The user may be provided with one or more suggestions that are related to the user input, "A." Based on the identified term "ABC" in the message trail, the user may be provided with suggestions as autocomplete suggestions that include "ABC" and/or "ABC" may be promoted to a higher ranking in a list of provided autocomplete suggestions. Also, for example, the suggestions may be provided to the user via a dropdown menu for the venue information field that may be populated with "ABC" based on the presence of "ABC" in the related message trail and/or "ABC" may be promoted to a higher ranking in the dropdown menu.

Referring to FIG. 1, a block diagram is provided of an example environment in which an n-gram of one or more messages of a message trail may be associated with a task entry. The example environment includes a computing device 105, a task engine 115, a message engine 120, a task database 125, an entity database 130, and a suggestion engine 135. The environment also includes a communication network 101 that enables communication between various components of the environment. In some implementations, the communication network 101 may include the Internet, one or more intranets, and/or one or more bus subsystems. The communication network 101 may optionally utilize one or more standard communications technologies, protocols, and/or inter-process communication techniques.

Figure 6:
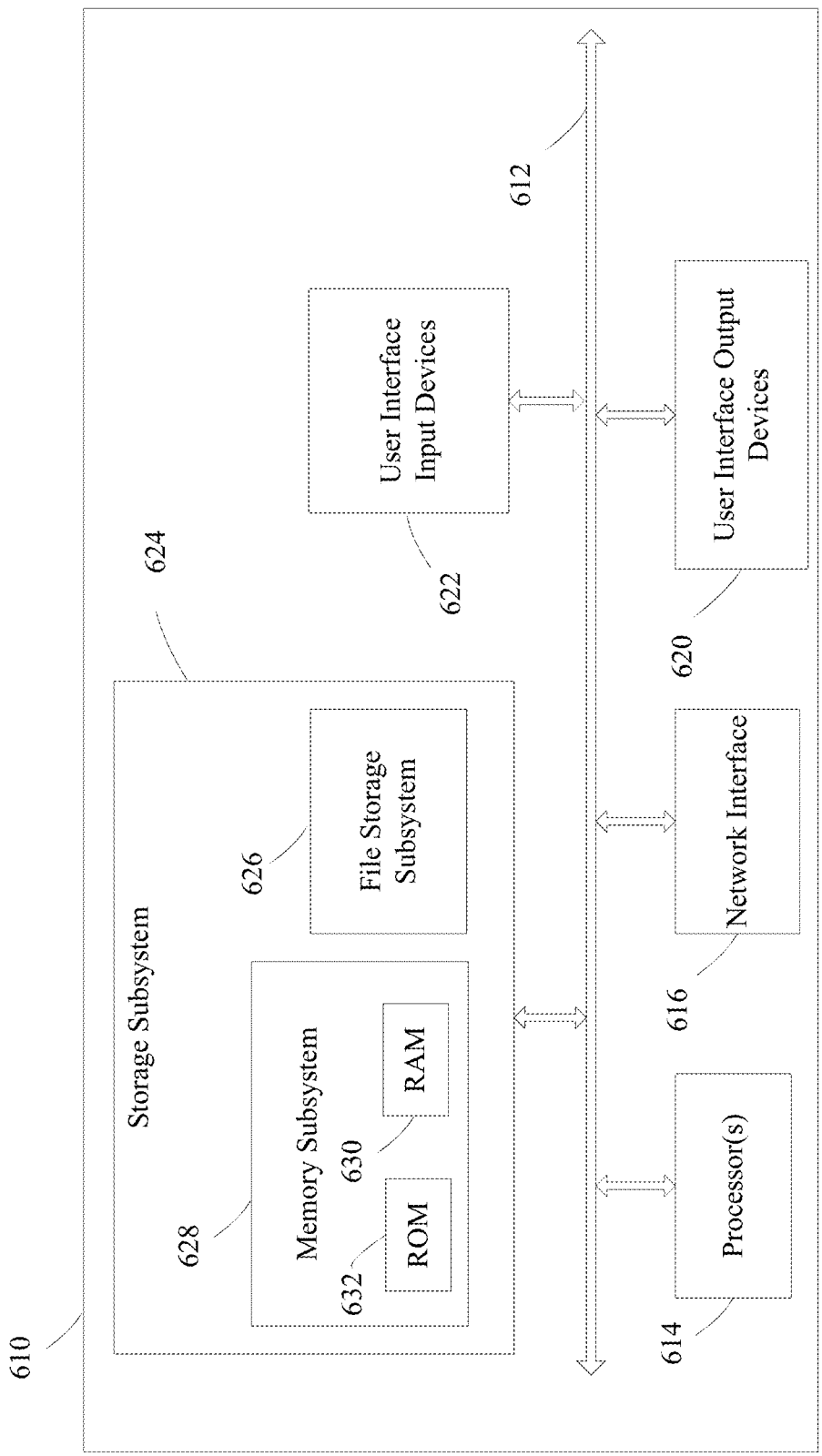
FIG. 6 illustrates a block diagram of an example computer system.

The computing device 105, task engine 115, message engine 120, task database 125, entity database 130, suggestion engine 135, and/or one or more additional components of the example environment of FIG. 1 may each include memory for storage of data and software applications, a processor for accessing data and executing applications, and components that facilitate communication over a network. In some implementations, computing device 105, task engine 115, message engine 120, task database 125, entity database 130, and/or suggestion engine 135 may include hardware that shares one or more characteristics with the example computer system that is illustrated in FIG. 6. The operations performed by components of the example environment may be distributed across multiple computer systems. For example, task engine 115, message engine 120, task database 125, entity database 130, and/or suggestion engine 135 may be computer programs running on computing device 105 and/or on one or more computers in one or more locations that are coupled to each other through a network.

The computing device 105 executes one or more applications and may be, for example, a desktop computer, a laptop computer, a cellular phone, a smartphone, a personal digital assistant (PDA), a tablet computer, a navigation system, a wearable computer device (e.g., glasses, watch, earpiece), and/or other computing device. The computing device 105 includes memory for storage of data and software applications, a processor for accessing data and executing applications, and components that facilitate communication over a communication network 101. In some implementations, the computing device 105 may include hardware that shares one or more characteristics with the example computer system that is illustrated in FIG. 6. In some implementations, computing device 105 may include software to send and/or receive messages, such as an email application, an instant messaging application, and/or a web browser. In some implementations, computing device 105 may include software to create, store, and/or alter task entries, such as a calendar application, a dedicated task application, a web browser, and/or a module of one or more applications executing on computing device 105.

In some implementations, task database 125 may be utilized by one or more components to store and/or access one or more task entries. For example, a task entry may be created and stored in a task database 125 and a reminder of the task entry may be provided to the user via computing device 105 at an appropriate time, such as one hour before the start of the event of the task entry. The task database 125 may include one or more storage mediums. For example, in some implementations, the task database 125 may include multiple computer servers each containing one or more storage mediums. Information described herein may optionally be stored in the task database 125 and/or an additional database. For example, task entries and associated information, such as information fields and related entities, may be stored in task database 125 for later access by one or more components. In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently.

A task may be created by a user and/or one or more applications that are indicative of an event that is of interest to a user. In some implementations, a task entry may be associated with one or more information fields that are related to the task entry, such as a venue information field, a start time, an end time, an event date, a membership group information field (e.g., club, association, charity group), and/or an event purpose information field (e.g., birthday party, business meeting). Task entries may be created by a user and/or by one or more applications that may identify information associated with a user and create the task entry based on the identified information. For example, an application may identify a message of a user and create a task entry based on one or more terms in the message.

In some implementations, entity database 130 may be utilized to identify and/or store one or more entities that may be associated with a task entry and/or an information field of a task entry. For example, entity database 130 may include a mapping (e.g., data defining an association) between entities and one or more attributes and/or other related entities. In some implementations, entities are topics of discourse. In some implementations, entities are persons, places, concepts, and/or things that can be referred to by a textual representation (e.g., a term or phrase) and are distinguishable from one another (e.g., based on context). For example, the text "bush" in a query or on a webpage may potentially refer to multiple entities such as President George Herbert Walker Bush, President George Walker Bush, a shrub, and the rock band Bush. In some implementations, an entity may be referenced by a unique entity identifier that may be used to identify the entity. The unique entity identifier may be associated with one or more attributes associated with the entity and/or with other entities. For example, in some implementations, the entity database 130 may include attributes associated with unique identifiers of one or more entities. For example, a unique identifier for the entity associated with the airport with an airport code "LAX" may be associated with a name or alias attribute of "LAX," another alias attribute of "Los Angeles International Airport" (an alternative name by which LAX is often referenced), a phone number attribute, an address attribute, and/or an entity type attribute of "airport" in the entity database. Additional and/or alternative attributes may be associated with an entity in one or more databases.

Associations between task entries, information fields of task entries, and/or one or more messages of a user may be determined based on identified associations between entities in an entity database that may share one or more aspects with entity database 130. For example, task engine 115 may be provided with a term from a message that is an alias of an entity in entity database 130. One or more additional properties associated with the entity, additional entities associated with the entity, and/or one or more additional properties associated with associated entities may be utilized to create a task entry. Also, for example, one or more information fields of a task entry may be determined based on one or more entities identified utilizing information that is associated with the task entry. For example, a task entry of a user may include a name information field of "Bob's birthday party." Task engine 115 may identify a "party" entity in the entity database 130 based on the task entry name. Additional information may be associated with the task entry based on information associated with the "party" entity in the entity database 130 and/or other database. For example, task engine 115 may identify a "location" entity attribute of a "party" entity and associate an "Event Location" information field with a task entry for "Bob's birthday party" based on determining that a task entry that is associated with a birthday party likely has an event location.

In some implementations, one or more of the task entries that are stored in task database 125 may be identified by task engine 115. In some implementations, task engine 115 may determine a task entry based on information that is provided by one or more applications utilized by a user. For example, a calendar application, an email application, a dedicated task application, and/or a component of one or more other applications executing on computing device 105 may identify information and/or one or more actions of the user and provide the information to task engine 115. Task engine 115 may create a task entry based on the provided actions of the user and/or additional information that was received from the application. In some implementations, task engine 115 may be provided with one or more terms that are identified from a message trail that includes one or more messages that have been sent and/or received by a user. The task engine 115 may determine a task entry, information fields of a task entry, and/or entities to associate with information fields of a task entry based on the provided one or more terms. For example, task engine 115 may determine a task entry based on an email that was sent and/or received by a user. Also, for example, task engine 115 may determine a task entry based on one or more terms from, for example, text messages, social media postings, and/or instant messages that were sent or received by the user. Task engine 115 may store the determined task entry in task database 125 for later use and/or further utilize the task entry before storing the task entry in task database 125.

In some implementations, task engine 115 may determine a task entry based on information that is identified by task engine 115 from one or more sources, such as databases and/or documents associated with the user. For example, task engine 115 may identify information from one or more emails of a user and determine a task entry based on the identified information. Also, for example, one or more applications and/or components may identify information from one or more sources and store the information in a database for later utilization by task engine 115.

Message engine 120 may identify one or more messages and/or a message trail that includes one or more related messages. A message includes one or more terms. The terms may be identified from, for example, a subject line of the message, a body of the message, recipient fields of the message, hyperlinks of the message, metadata of the message, and/or one or more additional or alternate components of a message. A message trail is a grouping of related messages. In some implementations, a message trail may be a linear continuation of messages between two or more parties. In some implementations, a message trail may include one or more branches of related messages between interested users. For example, User 1 may send a message to User 2 and User 3, both of which may independently reply to the message from User 1. Also, for example, User 2 may reply to the message by sending a reply message to both User 1 and User 3. Also, for example, User 2 may send a related message to User 3 and not to User 1. Examples of messages and/or message trails include emails, text messages sent and/or received on a mobile device, messages sent and/or received via an instant messenger, messages posted to an online message board, and/or messages posted on a social network. In some implementations, a message trail may be identified based on one or more additional characteristics of two or more messages. For example, a message trail may be identified based on similarity between subject lines of messages, similarity between recipients of messages, and/or similarity between terms of messages.

In some implementations, message engine 120 may be a component of one or more applications executing on computing device 105, such as an email application and/or a web browser. In some implementations, message engine 120 may be executing on a back end computing device of a system, such as a component of an email server, a social media system, and/or a text messaging service of a cellular phone provider. In some implementations, message engine 120 may monitor one or more messages and/or message trails of a user. For example, message engine 120 may be a component of an email application and may identify each email as it is received and/or sent by a user and determine a related message trail, if a message trail exists. In some implementations, a user may notify message engine 120 that a particular message or message trail is of interest. For example, a user may flag and/or include a key term in one or more messages that are sent and/or received by the user that notifies the message engine 120 to monitor the message trail that is associated with the message. In some implementations, the user may provide a message to message engine 120 as an indication that additional messages associated with the message may be of interest. For example, message engine 120 may be associated with an email address and the user may send a message to the email address associated with the message engine 120 as an indication to monitor additional messages associated with the message.

In some implementations, task engine 115 may utilize a message or messages of a message trail to initially determine a task entry and provide message engine 120 with an identifier of that message. For example, task engine 115 may determine a task entry based on an email and provide message engine 120 with the associated email and/or an identifier of the email. Also, for example, message engine 120 may identify an email trail and determine a task entry based on one or more terms of the emails of the email trail. Also, for example, task engine 115 may create a new task entry of "Bob's birthday" and provide message engine 120 with "Bob" as a term that, when the term is identified in a message and/or message trail, is likely related to the new task entry. In some implementations, task engine 115 may determine key terms for a task entry based on associations in entity database 130. For example, task engine 115 may create or identify a task entry of "Bob's birthday," identify "party" and "surprise" as related terms to "birthday" based on aliases of entities associated with a "birthday" entity in entity database 130, and provide message engine 120 with the terms "birthday," "party," and/or "surprise" as terms that, when identified in a message and/or message trail by message engine 120, are indicative of a likely association between the message and/or message trail and the task entry "Bob's birthday." In some implementations, message engine 120 may identify a message and utilize the message to identify a potentially related task entry. For example, message engine 120 may identify a message that includes "Restaurant 1" and identify one or more task entries in task database 125 that include "Restaurant 1" and/or include information associated with a restaurant as task entries that are potentially associated with the message.

Figure 3:
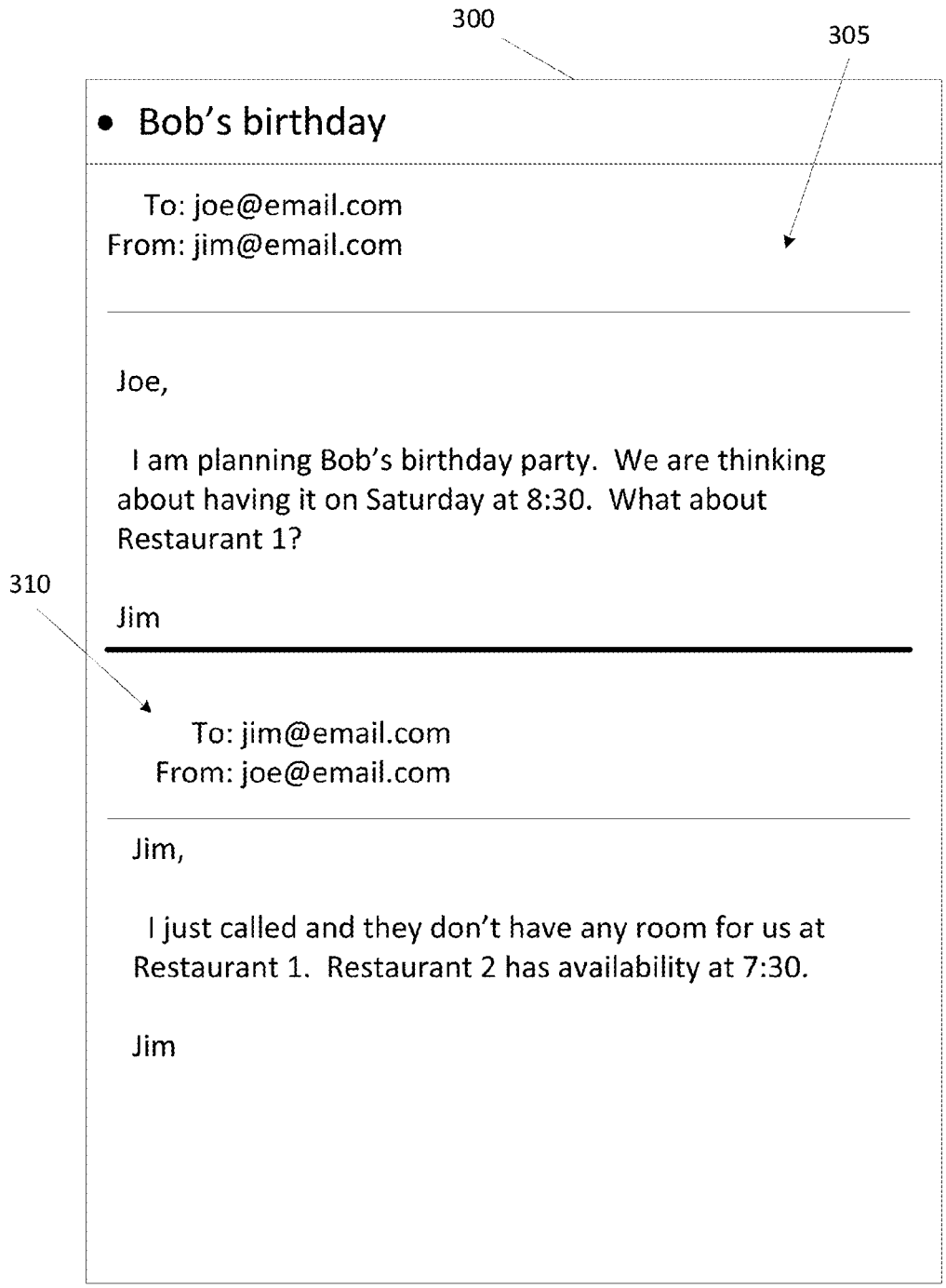
FIG. 3 is an illustration of an example of an email trail.

Referring to FIG. 3, an illustration of an example of an email trail is provided. In some implementations, the email trail 300 may be identified by a component that shares one or more characteristics with message engine 120. The email trail 300 may be identified based on the user initially sending or receiving the first message 305 of the email trail 300 and/or message engine 120 may identify the email trail 300 based on the response 310 by the user and/or a second user.

First message 305 may be associated with one or more task entries of the user based on one or more terms that are identified by message engine 120 in the first message 305. For example, the user may have a task entry with an event name of "Bob's birthday" and/or "Birthday Party," message engine 120 may identify the subject of the first message 305 as "Bob's Birthday," and associate the first message 305 with that task entry based on similarity of terms between the subject of first message 305 and the event name. Also, for example, message engine 120 may identify a task entry associated with the user that includes an event location of "Restaurant 1" and associate first message 305 with the task entry based on identifying "Restaurant 1" in message 305. In some implementations, message engine 120 may identify first message 305 and not initially associate the message with a task entry, but later associate the first message 305 and/or the message trail 300 with a task entry based on one or more terms in response 310. For example, message engine 120 may identify the term "Restaurant 1" in first message 305 and not associate first message 305 with a task entry until response 310 is received, which also includes the term "Restaurant 1."

Figure 4:
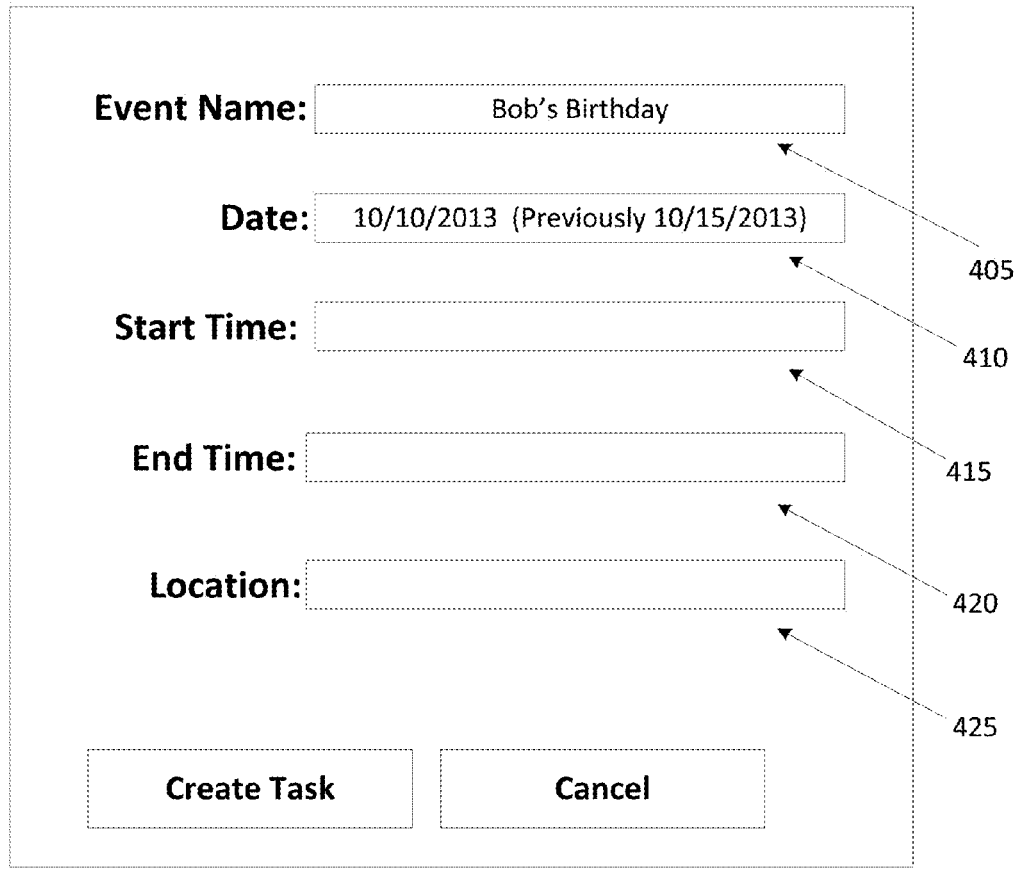
FIG. 4 is an illustration of an example task entry interface.

Referring to FIG. 4, an illustration of an example task entry interface is provided. The task entry interface may be provided by task engine 115 to a user via a computing device of the user. In some implementations, the task entry interface may be provided to the user via an application that is dedicated to creating and/or editing tasks. In some implementations, the task entry interface may include one or more of the information fields that are associated with a task entry and/or information that is assigned to an information fields by a user and/or one or more applications. The example task entry interface includes an event name information field 405, an event date information field 410, an event start time information field 415, an event end time information field 420, and a location information field 425. In some implementations, one or more of the information fields may allow a user to select information field information from a dropdown menu of suggestions as illustrated in FIG. 5 and described herein. In some implementations, one or more of the information fields may include a scrollable selection of suggestions as illustrated in FIG. 5 and described herein.

Figure 5A:
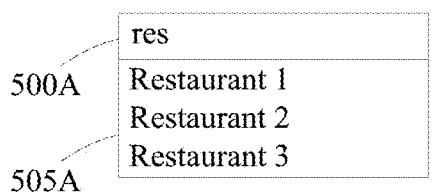
FIG. 5A is a partial screenshot of an example interface that can be used to provide suggestions to a user.
Figure 5B:
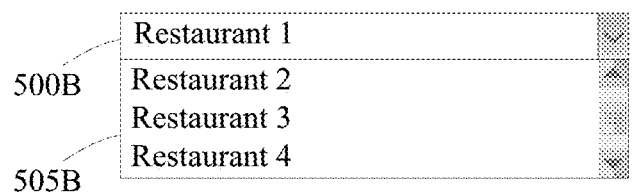
FIG. 5B is a partial screenshot of another example interface that can be used to provide suggestions to a user.
Figure 5C:
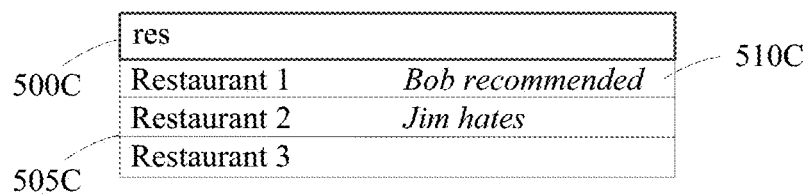
FIG. 5C is a partial screenshot of another example interface that can be used to provide suggestions to a user.

In some implementations, one or more information fields of a task entry may be populated with information that is associated with the task entry that is represented by the interface. In the provided example, the event name information field 405 is associated with an event name "Bob's birthday." In some implementations, the user may associate "Bob's birthday" with the "Event Name" information field 405. For example, the user may indicate an interest in creating a task entry and the interface of FIG. 4 may be provided to the user to enter information related to the new task entry via computing device 105. In some implementations, the event name information field 405 may be associated with "Bob's birthday" and the field may be populated with "Bob's birthday" by a component that shares one or more characteristics with task engine 115. For example, message engine 120 may identify first message 305 of FIG. 3 as a message that may be associated with a task entry, identify "Bob's birthday" as a term in first message 305, and associate the term "Bob's birthday" with the event name information field 405 of the task entry. In some implementations, one or more of the information fields that are represented in the task entry interface may be a text field as illustrated in FIG. 5A, a dropdown menu as illustrated in FIG. 5B, and/or a calendar entry field. For example, selecting the date field of the task entry field may display a calendar to allow the user to select a date and the field may be populated with the date that is selected by the user.

Message engine 120 may associate a message trail with a task entry that is associated with the user. In some implementations, message engine 120 may determine the task entry to associate with a message trail by identifying an association that was previously determined by task engine 115. For example, message engine 120 may associate a task entry with a message trail that was utilized by task engine 115 to initially determine the task entry. In some implementations, message engine 120 may determine a task entry to associate with a message trail based on one or more terms that are included in the body of the text of the message trail. For example, an email message may include a subject line of "Party 12/1/13" and message engine 120 may associate the message with a task entry that includes information related to an event on "12/1/13," a task entry that includes information related to "Party," and/or a task entry that includes information related to one or more recipients of the email. Also, for example, message engine 120 may identify terms that conform to one or more term formats in messages and/or message trails based on the likelihood that terms of that format may be appropriate for a task entry. For example, message engine 120 may identify all terms in a message trail that are in the form of a date (e.g., "10/10/13," "Oct. 10, 2013") as potential terms of interest based on identifying that dates are potentially associated with event date information fields of task entries.

Referring to FIG. 3, message engine 120 may identify response 310 as related to first message 305 and/or email trail 300 based on one or more terms in email trail 300. For example, message engine 120 may identify that first message 305 and response 310 include the same group of email addresses and/or that first message 305 and response 310 have the same or similar subjects (e.g. both having "Bob's birthday" as subjects and/or response 310 have a subject of "RE: Bob's birthday.") Also, for example, message engine 120 may identify response 310 as related to the first message 305 based on information from the application that was utilized by the users to transmit the messages. For example, an email application may utilize one or more methods to determine related emails that are sent and/or received by a user.

In some implementations, message engine 120 may be provided with one or more terms that are indicative of task entries that are associated with the user. For example, task engine 115 may provide message engine 120 with "Event Name" information for each task entry that is associated with the user if the task entry includes "Event Name" information. In some implementations, message engine 120 may identify one or more terms in a message and determine whether to associate a particular task entry with the message based on identified associations between one or more of the terms and the information fields of the task entry. For example, message engine 120 may identify a date of "Oct. 10, 2013" in a message and determine that an identified task entry that has an associated information field with a date of "Oct. 10, 2013" is likely related to the message based on the similarity of the dates. In some implementations, message engine 120 may identify multiple task entries that may be associated with a message and associate the message with the multiple task entries. For example, message engine 120 may identify two tasks entries with an "Event Date" information field of "Oct. 10, 2013" and further identify the term "Oct. 10, 2013" in a message. In that instance, message engine 120 may associate the message with both task entries and/or identify one or more terms in the message and/or subsequent related messages to determine that the message trail is associated with one of the task entries over the other task entry.

Message engine 120 may identify a new message that is associated with an existing message and/or message trail. For example, message engine 120 may identify a new email that is a reply to an email that was sent and/or received by a user and that has previously been identified by message engine 120 as associated with a task entry. Also, for example, message engine 120 may identify a new posting to a message board that includes one or more previous messages that are associated with a user and previously identified as associated with a task entry. Also, for example, message engine 120 may identify a text message that is sent by a user in response to one or more previous text messages that were sent to the user and previously identified as associated with a task entry. In some implementations, message engine 120 may monitor all messages that are sent and/or received by a user, messages that are specifically identified by the user as messages to monitor, messages that include one or more key terms that identify the message as potentially related to a task entry, new messages of message trails that have been associated with a particular task entry, and/or messages that were utilized by task engine 115 to initially determine a message.

Message engine 120 may identify one or more n-grams in the new message that are potentially associated with a task entry associated with the message trail that includes the new message. An n-gram may be identified in a new message based on, for example, term frequency inverse document frequency, prominence of the term in the message, number of times that a term has been mentioned in the message trail, and/or identification of an n-gram of a particular format (e.g., "10/03/13" as an n-gram of interest based on an n-gram of that format potentially being related to the associated task entry). In some implementations, an n-gram may be identified based on the n-gram being an alias of an entity that is a member of a category type. For example, an information field of "Event Location" may require a location to associate with the information field and message engine 120 may identify "Restaurant 1" in a new message. Message engine 120 may determine that "Restaurant 1" is a member of a "location" category in entity database 130 and, based on the n-gram "Restaurant 1" being a member of a "location" category, message engine 120 may determine that "Restaurant 1" is an n-gram of interest in the new message.

In some implementations, multiple n-grams in a message trail may be identified by message engine 120. Message engine 120 may determine one or more similarity scores for each n-gram for an associated task entry. A similarity score for a given n-gram is indicative of a likelihood that a user has interest in associating the given n-gram with the task entry associated with the message trail. In some implementations, a similarity score for an n-gram may be determined based on a similarity between the n-gram and a given information field. For example, the similarity score may be based on similarity between one or more entities that are associated with a given information field and one or more entities that are associated with the n-gram. For example, an information field may be "Event Location" and may be associated with a "location" entity category. An n-gram may be an alias of an entity that is associated with a "location" entity category and the "Event Location" information field may be based on the association of both of the entities to the "location" entity category.

In some implementations, a similarity score between an n-gram and a task entry may be determined based on one or more similarity scores between the n-gram and multiple information fields of the task entry. For example, an n-gram may be determined from one or more messages of a message trail that is associated with a task entry of "Bob's Birthday," which has information fields for event time and event location. Message engine 120 may determine a similarity score between the determined n-gram and the event time information field, determine a similarity score between the determined n-gram and the event location information field, and determine an overall similarity score between the n-gram and the task entry based on the information fields/n-gram similarity scores. Also, for example, a similarity score may be determined based on similarity between information associated with one or more of the information fields of task and the n-gram. In some implementations, message engine 120 and/or task engine 115 may utilize a similarity score between a task entry and an n-gram to determine one or more associations as described herein. For example, message engine 120 may determine a similarity score between an n-gram and a task entry, and provide the n-gram to task engine 115 only if the similarity score satisfies a threshold.

In some implementations, a similarity score between an n-gram and one or more information fields may additionally and/or alternatively be based on similarity between information that is associated with the information field in the task entry and the n-gram. For example, a similarity score for the n-gram "Restaurant 1" and an information field that that is associated with "Restaurant 2" may be based on the similarity between the terms "Restaurant 1" and "Restaurant 2" and/or similarity of one or more entities associated with the n-gram and the information of the information field (e.g., both are members of a "restaurant" entity category, both are members of a "location" entity category).

In some implementations, a similarity score may be determined based on one or more terms in the new message in addition to the n-gram. For example, an n-gram of "Restaurant 1" may be identified in a message and the n-gram may be preceded by the terms "I like." A similarity score between the n-gram and one or more information fields of the associated task entry may be determined based on the terms "I like" and the n-gram "Restaurant 1." For example, a sentiment classifier may be utilized to determine that "I like" reflects positive sentiment about the n-gram "Restaurant 1" and, based on the positive sentiment indicated by "I like," a similarity score indicative of a strong likelihood that the subsequent n-gram "Restaurant 1" should be associated with the associated task entry may be determined for the n-gram "Restaurant 1." On the other hand, "I hate" followed by "Restaurant 1" may be associated with a similarity score that is less indicative of "Restaurant 1" being associated with the associated task entry. Additional and/or alternative natural language processing techniques may be utilized by message engine 120 to determine similarity scores between n-grams and information fields of task entries. For example, natural language processing that indicates a higher importance of an n-gram in a message trail may have a determined similarity score that is more indicative of similarity than an n-gram that is determined to have lower importance in a message trail. Also, for example, an n-gram that is determined to have a positive sentiment may be associated with a determined similarity score that indicates a stronger association between the n-gram and information fields of an associated task entry than an n-gram that is determined to be associated with a negative sentiment.

Referring to FIG. 3, message engine 120 may determine a similarity score between one or more n-grams in the response 310 and one or more information fields of the task entry that is associated with the email trail 300. For example, message engine 120 may identify "Restaurant 2" in response 310 and determine a similarity score between "Restaurant 2" and a "Location" information field of an associated task entry based on identifying an entity in entity database 130 with an alias of "Restaurant 2" and identifying that the entity is a physical location. In some implementations, message engine 120 may determine an entity associated with and/or that "Restaurant 2" is a location based on identifying the location of the user, browsing history of the user, one or more other terms in the message trail, and/or one or more other characteristics of the user, such as identified user preferences. Also, for example, message engine 120 may determine a similarity score based on one or more additional n-grams in response 310 that are proximate, term frequency inverse document frequency of the "Restaurant 2" and/or one or more additional n-grams, and/or one or more other measures of prominence of the "Restaurant 2" in response 310.

An identified n-gram in a message trail may be associated with one or more components of a task entry. In some implementations, the identified n-gram may be utilized to alter information that is already associated with an information field of a task entry. In some implementations, the identified n-gram may be utilized to replace information of one or more information fields of a task entry and/or to associate new information with one or more information fields of a task entry. In some implementations, an n-gram may be utilized to rank suggestions for one or more components of the associated task. A suggestion is one or more terms that are provided to a user as potential terms to associate with an information field of a task entry. For example, an n-gram may be included in a listing of autocomplete suggestions when a user utilizes an interface, such as the interface of FIG. 4, and begins to input information into one or more of the information fields.

In some implementations, information fields that have been altered based on a determined n-gram in a message trail may be annotated to indicate to a user that the information has been altered. For example, referring to FIG. 4, date information field 410 includes a date of "10/10/2013" that is associated with the task entry based on an n-gram from a message of an associated message trail. The interface additionally includes "(Previously 10/15/2013)" as an indication to the user that the date has been altered by one or more components. For example, message engine 120 may provide an n-gram of "10/10/2013" to task engine 115 and task engine 115 may associate the date information field with "10/10/2013" based on, for example, a similarity score associated with the n-gram, a more positive sentiment associated with the n-gram over sentiment associated with "10/15/2013," and/or one or more factors as described herein.

In some implementations, message engine 120 may provide an n-gram to task engine 115 based on the similarity score between one or more task entries and the n-gram. Task engine 115 may utilize the n-gram, and optionally the associated similarity score, to update one or more information fields of a task. For example, a task entry may have an "Event Location" information field that is associated with "Restaurant 1." Message engine 120 may determine a similarity score between the "Event Location" information field and the n-gram "Restaurant 2" in a message trail that is associated with the same task entry and provide the n-gram "Restaurant 2" to task engine 115. In some implementations, task engine 115 may replace information that is associated with an information field with the n-gram that is provided by the message engine 120 based on the similarity score of the n-gram and the information field. For example, message engine 120 may determine a similarity score for an n-gram "Restaurant 2" that is indicative of changing an "Event Location" information field to "Restaurant 2" based on one or more techniques as described herein. Task engine 115 may utilize the provided n-gram to change the information field of the related task entry, associate the n-gram with an "Event Location" information field of the task that has not previously been associated with information, and/or determine that the existing information that is associated with the "Event Location" information field is more likely to be the information to associate with the information field than the provided n-gram.

In some implementations, task engine 115 may prompt the user to confirm associating the n-gram with the information field before the information field is updated. In some implementations, a confirmation message may be provided to the user before task engine 115 updates a task entry. In some implementations, task engine 115 may provide a confirmation message to the user only when the similarity score between the n-gram and the information field that is to be updated with the n-gram is below a threshold value. For example, an n-gram with a strong similarity score may not trigger providing a confirmation message to the user based on the high likelihood that the user has interest in updating the information field with the n-gram. Also, for example, an n-gram with a lower similarity score may be more likely to trigger a confirmation message based on a lower likelihood that the user has interest in updating the task entry with the n-gram than an n-gram with a stronger similarity score.

Figure 5D:
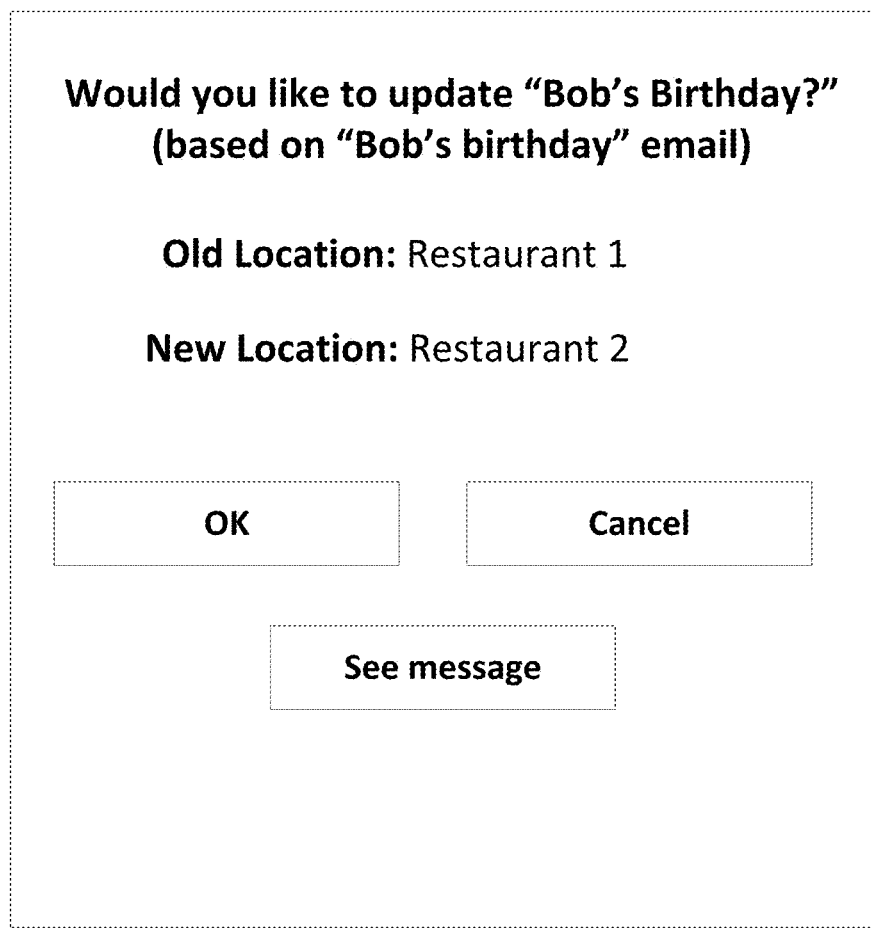
FIG. 5D is an example confirmation message that may be provided to a user before a task entry is updated.

Referring to FIG. 5D, an example confirmation message that may be provided to a user before a task entry is updated is provided. The confirmation message may be provided by task engine 115 via computing device 105. The confirmation message includes a message prompting that user to confirm an intended update of a task entry with an n-gram. The confirmation message allows the user to undo alterations to one or more information fields of the task entry that have been altered by task engine 115. For example, the confirmation message indicates that a new location, "Restaurant 2," has been determined for a location information field of the task entry "Bob's Birthday." The user may select "OK" and permit the alteration or select "Cancel" to keep the current value, "Restaurant 1." Additionally, the confirmation message allows the user to access the message that was utilized to determine the n-gram. In some implementations, the confirmation message may be provided to the user only when the similarity score between the n-gram and one or more information fields of the task entry do not satisfy a threshold as described herein.

In some implementations, message engine 120 may provide an n-gram and similarity score to suggestion engine 135. Suggestion engine 135 may utilize the n-gram and similarity score between the n-gram and a task entry to provide suggestions to a user when the user modifies the task entry associated with the n-gram. In some implementations, the user may access a task entry interface, such as the interface that is illustrated in FIG. 4, and begin to enter information into one or more fields. The user may be provided with a listing of suggestions based on input from the user. In some implementations, the suggestions may include an n-gram that is provided by message engine 120. The ranking and/or ordering of the provided suggestions may be based on the similarity score that was determined by message engine 120 for the n-gram.

In some implementations, message engine 120 may provide the n-gram to suggestion engine 135 without the associated similarity scores. For example, message engine 120 may determine one or more similarity scores between an n-gram and information fields of a task, determine that the n-gram is likely associated with the task entry based on the one or more similarity scores, and provide the n-gram to suggestion engine 135. Suggestion engine 135 may utilize one or more techniques to rank suggestions and include the n-gram in the ranked suggestions and/or boost the ranking of the n-gram in the suggestions. For example, suggestion engine 135 may utilize prefix matching to determine one or more suggestions to provide to the user and include the n-gram in a ranked list of suggestions. In some implementations, message engine 120 may identify one or more information fields that are the likeliest information fields that are related to the n-gram and suggestion engine 135 may include the n-gram in only the ranked suggestions for suggestions that are associated with the identified likely related information fields of the associated task entry.

For example, referring to FIG. 5A, a partial screenshot of an example interface that can be used to provide suggestions to a user is illustrated. In FIG. 5A, the partial screenshot includes an input field representation 500A and a dropdown menu 505A. In this example, the user has entered the partial term "res" into the input field representation 500A and drop down menu 505A is displayed. A module that may share one or more characteristics with suggestion engine 135 may identify one or more candidate suggestions that may be associated with the prefix "res." The suggestion engine 135 may identify suggestions based on, for example, one or more terms or n-grams identified by message engine 120 from a message trail, a list of past user input terms, a list of terms, and/or real time automatically generated terms. Suggestion engine 135 may associate a score with each identified suggestion, and rank the suggestions based on the associated scores. In some implementations, terms that are provided to suggestion engine 135 by message engine 120 may have associated similarity scores and may be ranked based on the similarity score that was determined by message engine 120. The drop down menu 505A includes three suggestions that are based on the partial search query "res," including "Restaurant 1," "Restaurant 2," and "Restaurant 3." The user may optionally choose any of the suggestions and utilize the suggestion as a completed input for the information field or the basis for input to associate the selected suggestion with an information field of a task entry. For example, the example of FIG. 5A may be provided to the user when the user selects the information field that is associated with "Event Location" of the interface of FIG. 4. The suggestions in dropdown menu 505A may be ranked and provided based in part on the presence of the terms "Restaurant 1" and "Restaurant 2" in email 300. In some implementations, the ordering of the suggestions in dropdown menu 505A may be determined based on a ranking of the suggestions. The ranking of the n-gram in the suggestions may be based, in part, on the similarity score determined by message engine 120.

Referring to FIG. 5B, another partial screenshot of an example interface that can be used to provide suggestions to a user is illustrated. The illustrated interface may be provided by suggestion engine 135 as one or more fields to select field information to associate with a task entry. For example, one or more of the fields of FIG. 4 may share one or more characteristics with the example environment of FIG. 5B. Current value field 500B indicates the current terms that are assigned to the information field. In some implementations, a user may scroll within the drop down menu 505B to display one or more additional suggestions. In some implementations, the user may indicate one of the selections of the dropdown menu 505B and the selection may be provided in the current value field 500B. In some implementations, the ordering of the suggestions in dropdown menu 505B may be determined based on a ranking of the terms. The ranking of the n-gram in the suggestions may be based, in part, on the similarity score determined by message engine 120.

In some implementations, suggestions that are identified from a message trail may be displayed differently than other suggestions. For example, suggestions may be displayed in an alternate color, a separate column, and/or marked with an indication to distinguish suggestions that were identified from a message trail from suggestions that were identified from one or more other sources (e.g., user input, one or more other documents). For example, referring to FIG. 5C, another partial screenshot of an example interface that can be used to provide suggestions to a user is illustrated. The partial screenshot includes an input field representation 500C and a dropdown menu 505C that includes selection 510C. Selection 510C includes an annotation of "Bob recommended" in addition to the suggestion "Restaurant 1." The annotation may be determined by message engine 120 based on one or more terms in a message that is associated with the task entry. For example, a message may be identified by message engine 120 that includes the terms "I like Restaurant 1." Message engine 120 may identify the message as originating from "Bob" and, based on the positive sentiment associated with "Restaurant 1" and the identified sender of the terms, message engine 120 may provide the n-gram "Restaurant 1" to task engine 115 with an annotation of "Bob recommended."

Many other configurations are possible having more or less components than the environment shown in FIG. 1. For example, although the components are each illustrated alone in FIG. 1, it is understood that the task engine 115, message engine 120, and/or suggestion engine 135 may optionally be combined with one another and/or with one or more of the other components of FIG. 1.

In situations in which the systems described herein collect personal information about users, or may make use of personal information, the users may be provided with an opportunity to control whether programs or features collect user information (e.g., information about a user's social network, email, social actions or activities, browsing history, a user's preferences, or a user's current geographic location), or to control whether and/or how to receive content from the content server that may be more relevant to the user. Also, certain data may be treated in one or more ways before it is stored or used, so that personally identifiable information may be removed. For example, a user's identity may be treated so that personally identifiable information may not be determined for the user, or a user's geographic location may be generalized where geographic location information may be obtained (such as to a city, ZIP code, or state level), so that a particular geographic location of a user may not be determined. Thus, the user may have control over how information is collected about the user and/or used.

Figure 2:
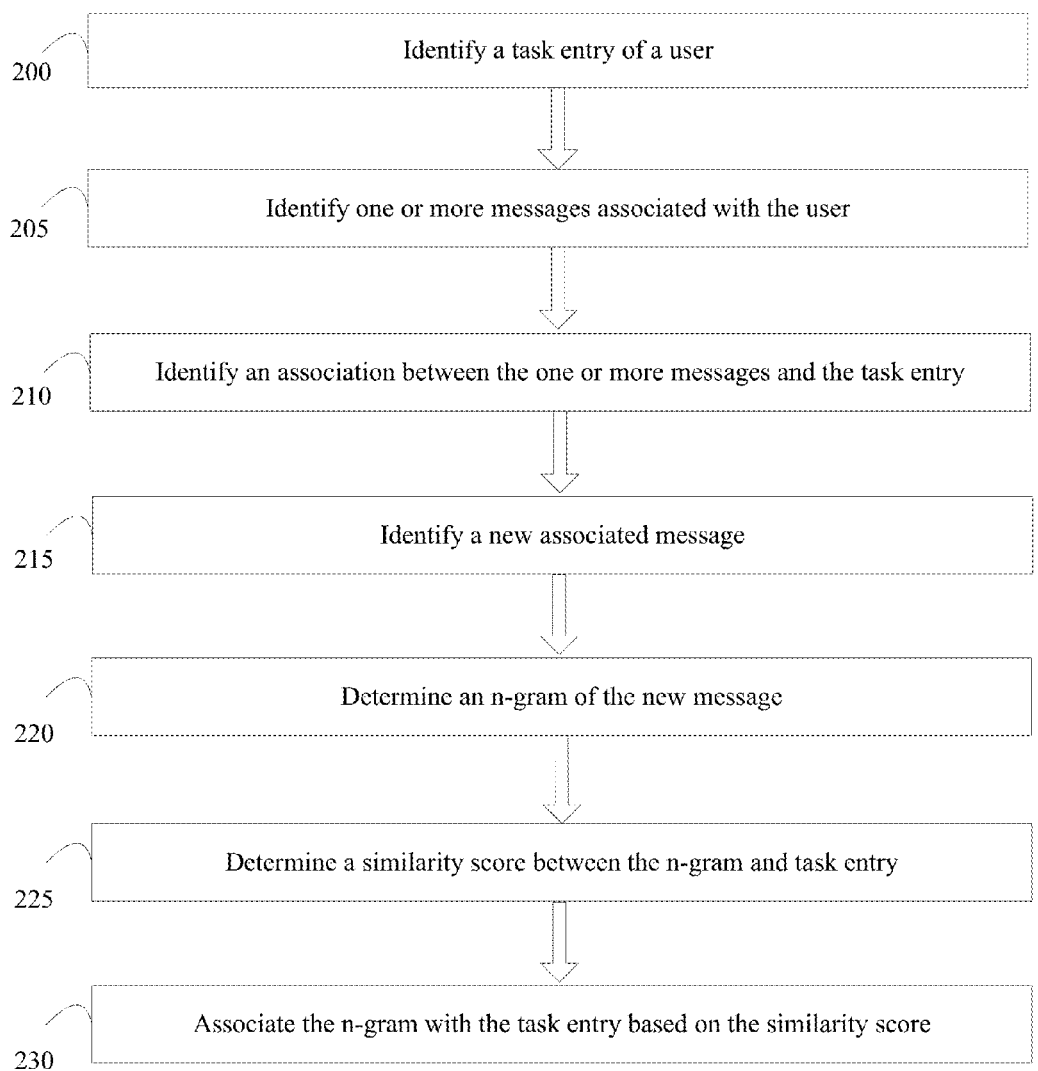
FIG. 2 is a flow chart illustrating an example method of associating terms with a task entry based on an associated message trail.

Referring to FIG. 2, a flow chart illustrating an example method of associating terms with a task entry based on an associated message trail is provided. Other implementations may perform the steps in a different order, omit certain steps, and/or perform different and/or additional steps than those illustrated in FIG. 2. For convenience, aspects of FIG. 2 will be described with reference to one or more components of FIG. 1 may perform the method such as the message engine 120.

At step 200, a task entry of the user is identified. The task entry of the user may be identified by a component that shares one or more characteristics with task engine 115. In some implementations, the task entry that is identified by task engine 115 may be associated with one or more information fields. In some implementations, the information fields that are associated with the identified task entry may be associated with one or more terms. In some implementations, task engine 115 may identify a task entry via a database, such as task database 125.

At step 205, one or more messages that are associated with the user are identified. The messages may be identified by a component that shares one or more characteristics with message engine 120. A message includes one or more terms in a body of text and the identified message may be sent and/or received by the user. In some implementations, the message that is identified may be a message in a message trail of two or more related messages. The messages may be associated with the user and one or more other users that may send and/or receive subsequent messages of a message trail.

At step 210, an association between the message or messages that were identified at step 205 and the task entry is identified. The message may be associated with the task entry based on one or more terms that are identified in the message. For example, a message may include a term that is an alias of an entity that is associated with an entity that is related to the task entry. In some implementations, a message may be associated with a task entry based on information that is associated with an information field of the task entry. For example, a task entry may include an "Event Location" information field that includes a name of a restaurant and message engine 120 may identify a restaurant name in the message that is similar and/or identical to the restaurant name in the "Event Location" information field. In some implementations, the user may create a task entry and indicate one or more messages to associate with the created task entry.

At step 215, a new message that is associated with the identified message is identified. The new message may be one or more of the new messages of the message trail that was identified at step 210 by message engine 120. For example, message engine 120 may identify an email of a user at step 210 and may identify a reply by the user and/or one or more other users to the email message. In some implementations, message engine 120 may monitor the message trail that was identified at step 210 and further identify additional messages that are related to the message trail.

At step 220 an n-gram is identified in the new message. In some implementations, the n-gram may be identified by a component that shares one or more characteristics with message engine 120. Message engine 120 may identify the n-gram in the new message based on, for example, term frequency inverse document frequency of the n-gram, prominence of the n-gram in the message, number of times that the n-gram has been mentioned in the message trail, and/or identification of the n-gram of a particular format. In some implementations, an n-gram may be an alias of an entity that is associated with a task entry. For example, an information field of "Event Location" may require a location to associate with the information field and message engine 120 may identify "Restaurant 1" in a new message. Message engine 120 may determine that "Restaurant 1" is a member of a "Location" entity in entity database 130 and, based on the n-gram "Restaurant 1" being a location, message engine 120 may determine that "Restaurant 1" is an n-gram of interest in the new message.

In some implementations, the determined n-gram may be an n-gram that is not present in the message trail that is associated with a task entry. For example, message engine 120 may identify one or more terms in a new message of a message trail, identify an entity in entity database 130 with the identified terms as an alias, and determine an n-gram that is associated with the identified entity. Also, for example, an n-gram may be determined that is a variation of an identified term in the message trail. For example, a message may include "on the 9th" and message engine 120 may determine a date of "Oct. 9, 2013" based on determining that "on the 9th" is likely a reference to that date.

At step 225, a similarity score is determined between the identified n-gram and one or more aspects of the task entry. In some implementations, the similarity score may be determined between one or more of the information fields of the task entry and the n-gram. The similarity score may be based on one or more of the methods as described herein. For example, the similarity score may be based on a relationship between an entity with the n-gram as an alias and an entity associated with the task entry and/or an information field of the task entry, association between the n-gram and one or more additional terms in the new message, and/or prominence of the n-gram in the new message.

At step 230, the n-gram is associated with the task entry based on the similarity score. In some implementations, the n-gram and associated similarity scores may be utilized to rank one or more terms that are associated with the task entry. For example, the n-gram may be utilized to rank one or more terms, including the n-gram, to provide to the user as suggestions for an information field. In some implementations, the n-gram and associated similarity scores may be utilized to update an information field. For example, an information field of a task entry may include a location, the n-gram may be identified as a location, and the information field may be replaced with the n-gram based on the similarity score. In some implementations, the n-gram and associated similarity scores may be utilized to initially populate one or more information fields of a task entry. For example, an information field of a task may not be associated with information and the n-gram may be determined to be associated with that information field based on the similarity being indicative of information that is related to the information field.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 626 and a file storage subsystem 628, user interface input devices 622, user interface output devices 620, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to associate a task entry with a message trail based on one or more terms of a message of the message trail and/or provide an n-gram from a message of the message trail for association with the task entry.

These software modules are generally executed by processor 614 alone or in combination with other processors. Memory 626 used in the storage subsystem can include a number of memories including a main random access memory (RAM) 630 for storage of instructions and data during program execution and a read only memory (ROM) 632 in which fixed instructions are stored. A file storage subsystem 628 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 628 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
   identifying a task entry of a user utilizing one or more processors, wherein the task entry includes one or more information fields;
   identifying, utilizing one or more of the processors, one or more messages sent or received by the user, wherein each of the messages includes one or more terms;
   identifying, utilizing one or more of the processors, an association between the task entry and the one or more messages;
   identifying, utilizing one or more of the processors, that a new message is related to the one or more messages, wherein the new message is sent or received by the user after creation of the task entry of the user, and wherein the new message includes one or more new message terms;
   determining, utilizing one or more of the processors, an n-gram based on the one or more new message terms of the new message;
   determining, utilizing one or more of the processors, a similarity score between the n-gram and the task entry, wherein the similarity score is indicative of a likelihood that the user has interest in associating the n-gram with the task entry; and
   associating, utilizing one or more of the processors, the n-gram with the task entry based on the similarity score.

2. The method of claim 1, wherein the task entry is created based on the one or more messages.

3. The method of claim 1, wherein the task entry includes a plurality of information fields and wherein the similarity score is between the n-gram and a given information field of the information fields of the task entry, and wherein associating the n-gram with the task entry includes associating the n-gram with the given information field based on the similarity score.

4. The method of claim 3, wherein one or more task terms are assigned to the given information field.

5. The method of claim 3, wherein the one or more task terms are identified from the terms of the one or more messages and are utilized to create the task entry prior to the new message being sent or received by the user.

6. The method of claim 4, further comprising: replacing the task terms with the n-gram if the similarity score between the n-gram and the given information field satisfies a threshold value.

7. The method of claim 4, further comprising: prompting the user to replace the task terms with the n-gram.

8. The method of claim 3, further comprising: ranking the n-gram relative to other n-grams associated with the given information field, wherein the ranking for the n-gram is based on the similarity score.

9. The method of claim 1, further comprising:
   identifying an input term provided by the user as input to an input task information field of the task information fields;
   ranking the n-gram relative to other n-grams based on similarity between the n-gram and the input term; and
   providing the n-gram to the user as an autocomplete suggestion for the input term based on the ranking.

10. The method of claim 9, wherein the ranking is further based on the similarity score between the n-gram and the task entry.

11. The method of claim 10, further comprising: determining at least one of the other n-grams from the one or more messages.

12. The method of claim 1, further comprising:
   determining an annotation for the n-gram, wherein the annotation is determined based on one or more other terms of the new message; and
   associating the annotation with the n-gram.

13. The method of claim 1, wherein at least one of the information fields of the task entry is associated with an entity, and wherein determining the similarity score includes determining an association between the n-gram and the entity.

14. A method, comprising:
   identifying a task entry of a user utilizing one or more processors, wherein the task entry includes one or more information fields, and wherein a given information field of the information fields is associated with a task term;
   identifying, utilizing one or more of the processors, one or more messages sent or received by the user after creation of the task entry of the user, wherein each of the messages includes one or more message terms;

identifying, utilizing one or more of the processors, an association between the task entry and the one or more messages;

determining, utilizing one or more of the processors, an n-gram based on the message terms of one or more of the messages;

determining, utilizing one or more of the processors, a similarity score between the n-gram and the given information field of the task entry;

ranking, utilizing one or more of the processors, the n-gram and the task term based on the similarity score.

15. The method of claim 14, further comprising:

identifying an input term provided by the user as input to the given information field, and wherein the ranking is further based on the input term.

16. A system including memory and one or more processors operable to execute instructions stored in memory, comprising instructions to:

identify a task entry of a user, wherein the task entry includes one or more information fields;

identify one or more messages sent or received by the user, wherein each of the messages includes one or more terms;

identify an association between the task entry and the one or more messages;

identify a new message that is related to the one or more messages, wherein the new message is sent or received by the user after creation of the task entry of the user, and wherein the new message includes one or more new message terms;

determine an n-gram based on the one or more new message terms of the new message;

determine a similarity score between the n-gram and the task entry, wherein the similarity score is indicative of a likelihood that the user has interest in associating the n-gram with the task entry; and associate the n-gram with the task entry based on the similarity score.

17. The system of claim 16, wherein the task entry includes a plurality of information fields and wherein the similarity score is between the n-gram and a given information field of the information fields of the task entry, and wherein the instructions to associate the n-gram with the task entry includes instructions to associate the n-gram with the given information field based on the similarity score.

18. The system of claim 17, wherein the one or more task terms are identified from the terms of the one or more messages and are utilized to create the task entry prior to the new message being sent or received by the user.

19. The system of claim 18, wherein the instructions further include instructions to replace the task terms with the n-gram if the similarity score between the n-gram and the given information field satisfies a threshold value.

20. The system of claim 17, wherein the instructions further include instructions to: rank the n-gram relative to other n-grams associated with the given information field, wherein the ranking for the n-gram is based on the similarity score.

21. The system of claim 16, wherein the instructions further include instructions to:

identify an input term provided by the user as input to an input task information field of the task information fields;

rank the n-gram relative to other n-grams based on similarity between the n-gram and the input term; and provide the n-gram to the user as an autocomplete suggestion for the input term based on the ranking.

22. The system of claim 16, wherein the instructions further include instructions to:

determine an annotation for the n-gram, wherein the annotation is determined based on one or more other terms of the new message; and associate the annotation with the n-gram.

23. The system of claim 16, wherein at least one of the information fields of the task entry is associated with an entity, and wherein the instructions to determine the similarity score includes instructions to determine an association between the n-gram and the entity.

* * * * *